US009797270B2

(12) United States Patent
O'Leary

(10) Patent No.: US 9,797,270 B2
(45) Date of Patent: Oct. 24, 2017

(54) RECESSABLE DAMPER FOR TURBINE

(71) Applicant: Rolls-Royce North American Technologies, Inc., Indianapolis, IN (US)

(72) Inventor: Mark O'Leary, Zionsville, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 360 days.

(21) Appl. No.: 14/552,089

(22) Filed: Nov. 24, 2014

(65) Prior Publication Data

US 2015/0308287 A1    Oct. 29, 2015

Related U.S. Application Data

(60) Provisional application No. 61/919,973, filed on Dec. 23, 2013.

(51) Int. Cl.
*F01D 25/06* (2006.01)
*F01D 5/22* (2006.01)

(52) U.S. Cl.
CPC .............. *F01D 25/06* (2013.01); *F01D 5/22* (2013.01)

(58) Field of Classification Search
CPC ... F01D 25/06; F01D 5/10; F01D 5/26; F01D 5/045; F01D 5/16; F01D 5/22; F01D 5/04; F01D 11/006; F01D 11/008; F05D 2260/96
USPC .......................................... 415/500; 416/190
See application file for complete search history.

(56) References Cited

U.S. PATENT DOCUMENTS

| | | | | |
|---|---|---|---|---|
| 2,198,784 A | * | 4/1940 | Mikina | F01D 5/22 416/196 R |
| 3,295,825 A | * | 1/1967 | Hall, Jr. | F01D 5/06 415/173.7 |
| 3,709,631 A | * | 1/1973 | Karstensen | F01D 5/22 416/193 A |
| 3,837,761 A | * | 9/1974 | Brown | F01D 5/22 416/191 |

(Continued)

FOREIGN PATENT DOCUMENTS

| | | | | |
|---|---|---|---|---|
| DE | EP 1600606 A1 | * | 11/2005 | F01D 5/22 |
| EP | 0851097 A2 | * | 7/1998 | F01D 11/008 |

(Continued)

OTHER PUBLICATIONS

Extended European Search Report issued in connection with European Application No. 14195463.6-1610 / 2957723, dated Nov. 16, 2015, 9 pages.

(Continued)

*Primary Examiner* — Kenneth Bomberg
*Assistant Examiner* — Brian Delrue
(74) *Attorney, Agent, or Firm* — Barnes & Thornburg LLP

(57) ABSTRACT

A turbine blade damping system for a turbine includes a turbine blade platform and a damper recessable within a pocket defined by the platform. An underside of the platform defines a beveled surface. An outer side of the damper defines a complementary beveled surface. When the turbine spools up, centrifugal force acting on the damper forces it in an outward direction from the pocket toward a mating surface of an adjacent turbine blade platform.

14 Claims, 5 Drawing Sheets

(56) References Cited

U.S. PATENT DOCUMENTS

| | | | | |
|---|---|---|---|---|
| 4,457,668 | A | * | 7/1984 | Hallinger .................. F01D 5/26 416/190 |
| 4,872,812 | A | | 10/1989 | Hendley et al. |
| 4,936,749 | A | * | 6/1990 | Arrao ........................ F01D 5/22 416/190 |
| 5,156,528 | A | * | 10/1992 | Bobo ......................... F01D 5/22 416/190 |
| 5,478,207 | A | * | 12/1995 | Stec ........................... F01D 5/22 416/219 R |
| 5,573,375 | A | | 11/1996 | Barcza |
| 5,599,170 | A | | 2/1997 | Marchi et al. |
| 5,746,578 | A | * | 5/1998 | Brassfield ................. F01D 5/26 416/190 |
| 5,785,499 | A | | 7/1998 | Houston et al. |
| 5,803,710 | A | | 9/1998 | Dietrich et al. |
| 5,827,047 | A | | 10/1998 | Gonsor et al. |
| 5,924,699 | A | * | 7/1999 | Airey .................... F01D 11/008 277/411 |
| 6,273,683 | B1 | | 8/2001 | Zagar et al. |
| 6,354,803 | B1 | * | 3/2002 | Grover ...................... F01D 5/26 29/889.21 |
| 6,786,696 | B2 | * | 9/2004 | Herman ................... F01D 5/147 416/193 A |
| 6,851,932 | B2 | | 2/2005 | Lagrange et al. |
| 7,534,090 | B2 | | 5/2009 | Good et al. |
| 8,011,892 | B2 | | 9/2011 | Ramlogan et al. |
| 8,393,869 | B2 | * | 3/2013 | Kim ........................... F01D 5/22 416/219 R |
| 2001/0038793 | A1 | * | 11/2001 | Brandl ....................... F01D 5/22 416/190 |
| 2002/0146322 | A1 | * | 10/2002 | Yeo ............................ F01D 5/22 416/190 |
| 2005/0079062 | A1 | * | 4/2005 | Surace ....................... F01D 5/22 416/248 |
| 2006/0013691 | A1 | * | 1/2006 | Athans ...................... F01D 5/22 416/193 A |
| 2006/0257262 | A1 | * | 11/2006 | Itzel .......................... F01D 5/22 416/248 |
| 2007/0134099 | A1 | * | 6/2007 | Lee ........................... F01D 5/22 416/193 A |
| 2007/0286732 | A1 | * | 12/2007 | Good ........................ F01D 5/10 416/190 |
| 2007/0286734 | A1 | * | 12/2007 | Lagrange .................. F01D 5/22 416/93 R |
| 2008/0181779 | A1 | * | 7/2008 | Decardenas ............. F01D 5/147 416/219 R |
| 2009/0004021 | A1 | * | 1/2009 | Baumhauer ............... F01D 5/10 416/229 R |
| 2009/0263235 | A1 | * | 10/2009 | Tibbott .................. F01D 11/008 415/116 |
| 2010/0272568 | A1 | * | 10/2010 | Roush ................... F01D 11/006 416/1 |
| 2012/0121424 | A1 | * | 5/2012 | Wassynger ................ F01D 5/24 416/190 |
| 2013/0195665 | A1 | * | 8/2013 | Snyder ...................... F01D 5/22 416/174 |
| 2014/0030100 | A1 | * | 1/2014 | Joshi ..................... F01D 5/3007 416/219 R |
| 2014/0079529 | A1 | * | 3/2014 | Kareff ....................... F01D 5/24 415/1 |
| 2014/0369844 | A1 | * | 12/2014 | Hansom .................. F01D 5/147 416/223 R |

FOREIGN PATENT DOCUMENTS

| | | | | |
|---|---|---|---|---|
| EP | 1477634 | A2 | * | 11/2004 ............... F01D 5/22 |
| EP | 1795703 | A2 | * | 6/2007 ............... F01D 5/22 |
| EP | 1867837 | A2 | | 12/2007 |
| EP | 2009247 | A2 | | 12/2008 |
| EP | 2472065 | A1 | * | 7/2012 ............... F01D 5/22 |

OTHER PUBLICATIONS

European Examination Report issued in connection with European Application No. 141954616-1610, dated Sep. 16, 2016, 4 pages.

* cited by examiner

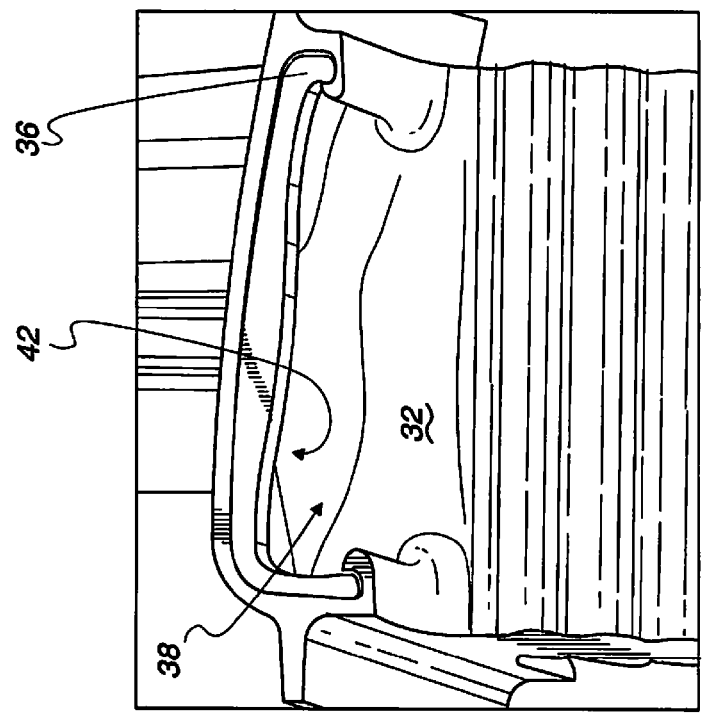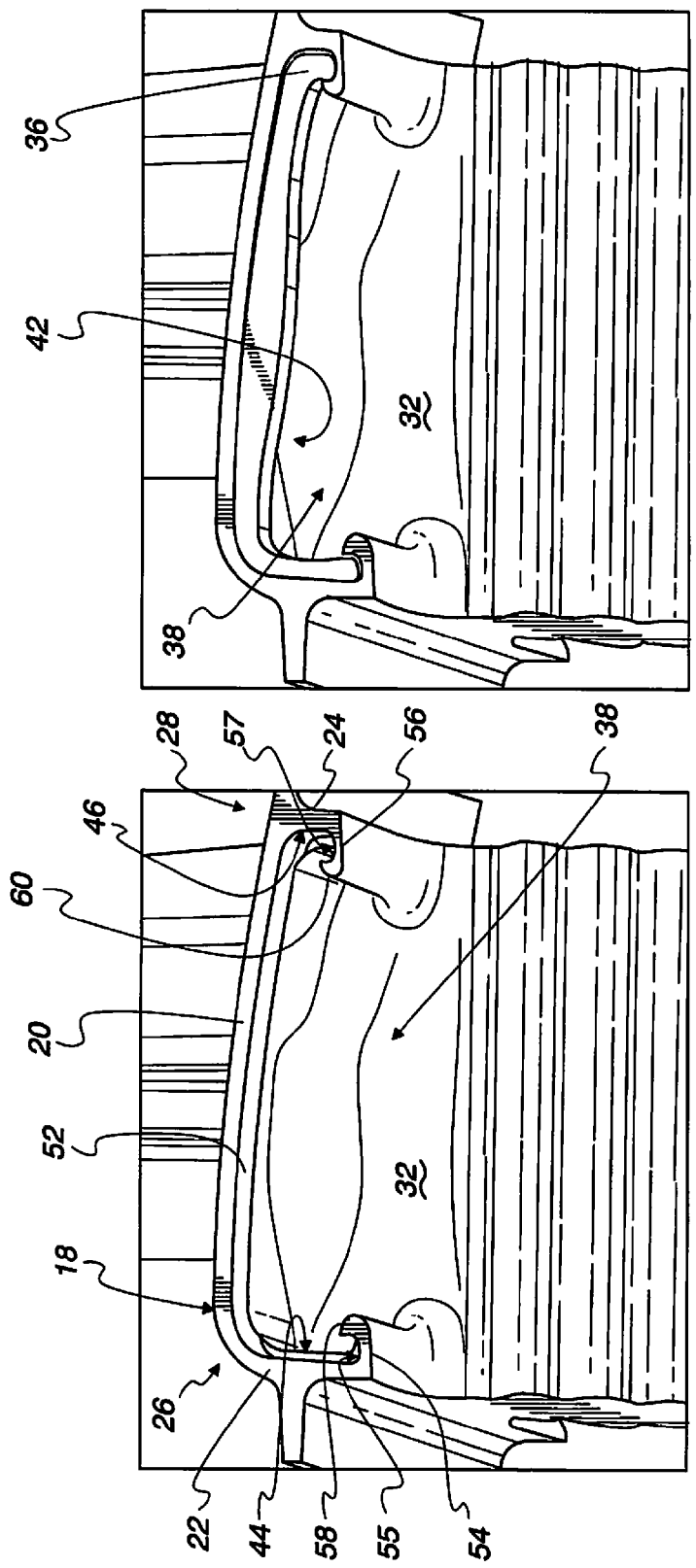

RECESSABLE DAMPER FOR TURBINE

CROSS REFERENCE TO RELATED APPLICATIONS

This application claims priority to and the benefit of U.S. Provisional Patent Application No. 61/919,973, filed 23 Dec. 2013, the disclosure of which is now expressly incorporated herein by reference.

GOVERNMENT INTEREST STATEMENT

The present invention was made using U.S. Government funding under U.S. Government contract no. FA8650-07-C-2803. The U.S. Government may have certain rights in the present invention.

FIELD OF THE DISCLOSURE

The present disclosure relates generally to turbine blade dampers, and more specifically to a turbine blade damper that recesses into a pocket under a turbine blade platform.

BACKGROUND

Gas turbine engines are used to power aircraft, watercraft, power generators, and the like. Gas turbine engines include a compressor section, a combustor section, and a turbine section. The turbine section typically includes a series of turbine blades disposed circumferentially about and extending radially from a wheel to form a turbine rotor. Each turbine blade included in a rotor typically has a platform, a root extending radially inwardly from the platform to the wheel for engagement with the wheel, and an airfoil extending radially outwardly from the platform toward a surrounding shroud covering the turbine rotor. A gap is often provided between adjacent platforms to accommodate manufacturing and assembly of the turbine rotor.

Sometimes a damper is provided between pairs of adjacent turbine blade to fill at least a portion of the gap formed between platforms of the adjacent turbine blades. The damper typically is configured to provide some amount of sealing between adjacent platforms and to dampen vibrations of the corresponding turbine blades.

SUMMARY

The present invention may comprise one or more of the following features and combinations thereof.

A turbine blade damping system may include a platform defining a pocket and a damper recessable within the pocket. The damper may be extended from the pocket into engagement with a sealing surface of an adjacent platform.

In some embodiments, the platform may have a leading end, a trailing end, a first circumferential side, a second circumferential side, a radially-outward side, and a radially-inward side. The radially-inward side may define the pocket, which may extend circumferentially inwardly from the first circumferential side. The pocket may have a ceiling portion, a first wall portion extending radially inward from the ceiling portion proximate the leading end, a second wall portion extending radially inward from the ceiling portion proximate the trailing end, a first floor portion extending from the first wall portion toward the second wall portion, and a second floor portion extending from the second wall portion toward the first wall portion. The ceiling portion may define a pocket beveled surface extending circumferentially inwardly from the first circumferential side. The second circumferential side may define a platform sealing surface.

In some embodiments, the damper may have a leading end, a trailing end, a first circumferential side, a second circumferential side, a body portion, a radially-outward side, a first leg portion extending radially inwardly from the leading end of the body portion, and a second leg portion extending radially inwardly from the trailing end of the body portion, the first circumferential side defining a damper sealing surface. The radially-outward side of the damper may define a damper beveled surface. The damper beveled surface may be slidingly engaged with the pocket beveled surface, and the damper may be movable with respect to the platform between a first position wherein at least a portion of the damper is recessed within the pocket and a second position wherein a lesser portion of the damper is recessed with the pocket and the damper sealing surface is engaged with a platform sealing surface of an adjacent platform.

In some embodiments, the first and second leg portions of the damper define respective outer surfaces, wherein the respective outer surfaces are in sliding engagement the first and second wall portions of the pocket.

In some embodiments, the first and second leg portions of the damper may define respective feet, the respective feet engaged with the first and second floor portions when the damper is in the first position.

In some embodiments, the platform and an adjacent platform may be attached to a wheel.

In some embodiments, the turbine blade damping system may include additional platforms and additional dampers associated with adjacent pairs of platforms.

These and other features of the disclosure will become more apparent from the following description of the illustrative embodiments.

BRIEF DESCRIPTION OF THE DRAWINGS

FIG. 4 is a side perspective view of the turbine blade showing the platform defining the pocket and a pocket beveled surface thereof;

FIG. 5 is a side perspective view similar to FIG. 4 further showing the damper recessed within the pocket;

DETAILED DESCRIPTION OF THE DRAWINGS

Figure 1:
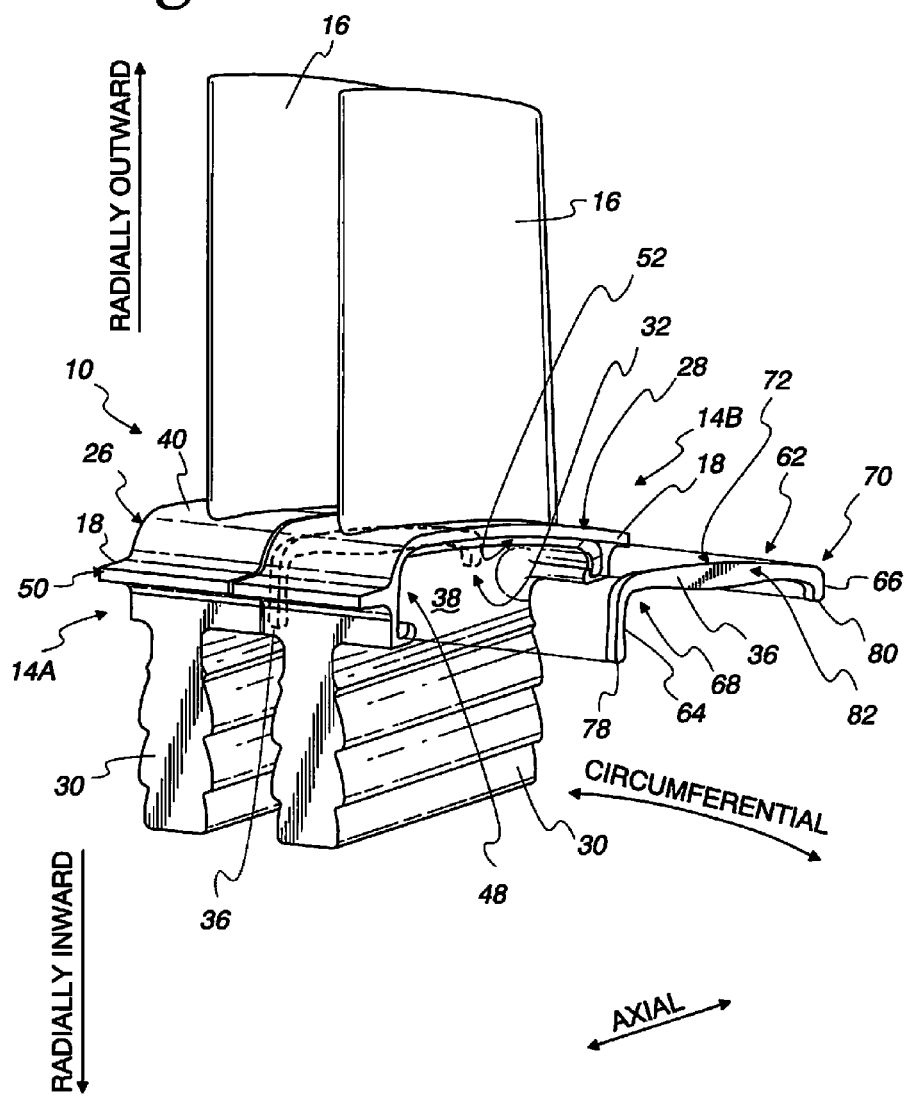
FIG. 1 is a partially exploded perspective view of a pair of turbine blades, each including a platform defining a pocket, a root extending radially inwardly from the platform and an airfoil extending radially outwardly from the platform, and further showing a damper spaced from pocket.

For the purpose of promoting an understanding of the principles of the disclosure, reference will now be made to one or more illustrative embodiments illustrated in the drawings, and specific language will be used to describe the same.

Figures 2, 3:
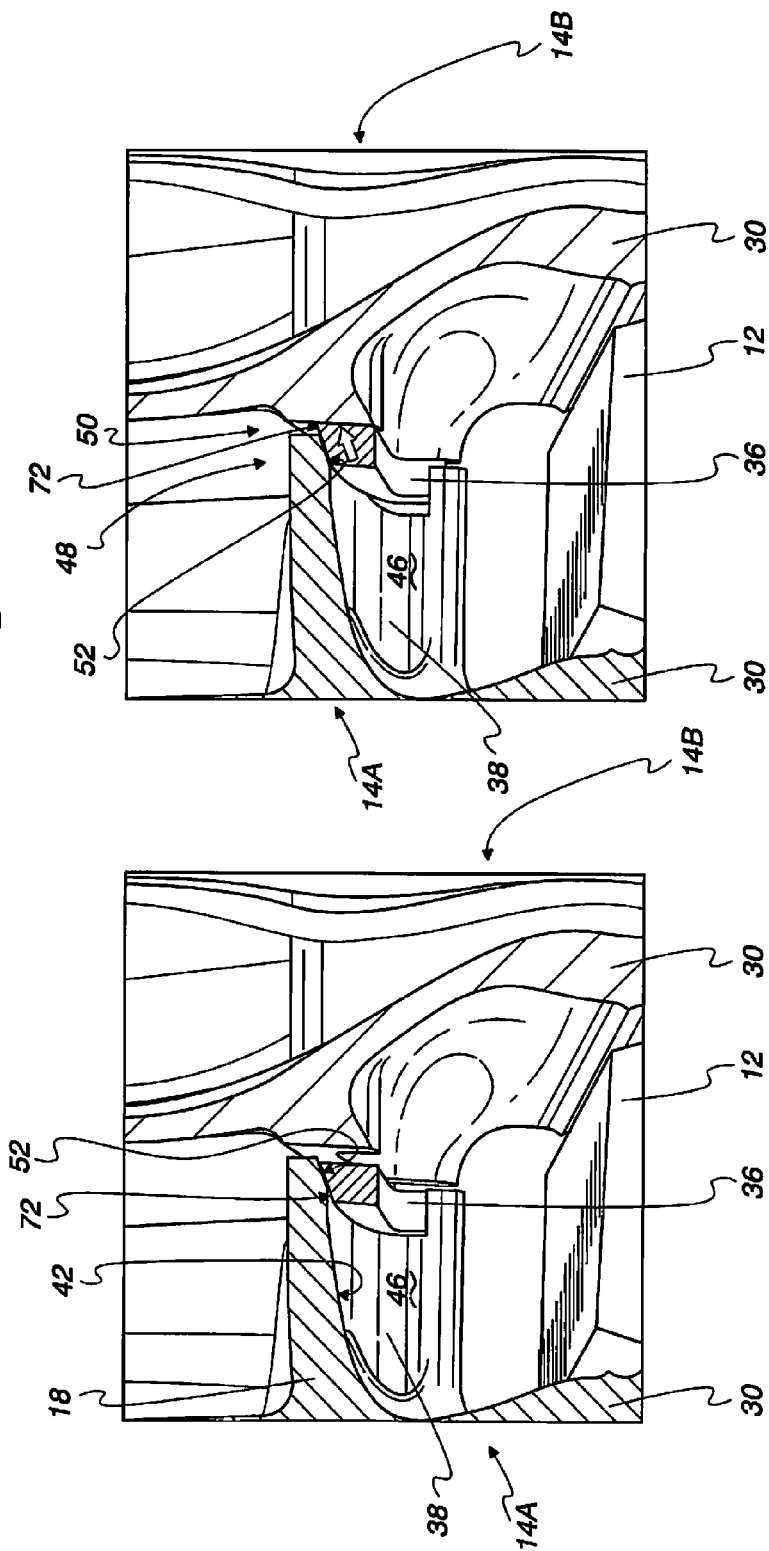
FIG. 2 is a cross-sectional side view of turbine blades showing roots thereof engaged with a wheel, and the damper recessed within pocket of the turbine blade.
FIG. 3 is a cross-sectional side view of the turbine blades showing roots thereof engaged with a wheel, and the damper partially extended from the pocket of the turbine blade and in contact with a surface of the adjacent turbine blade.
Figure 6:
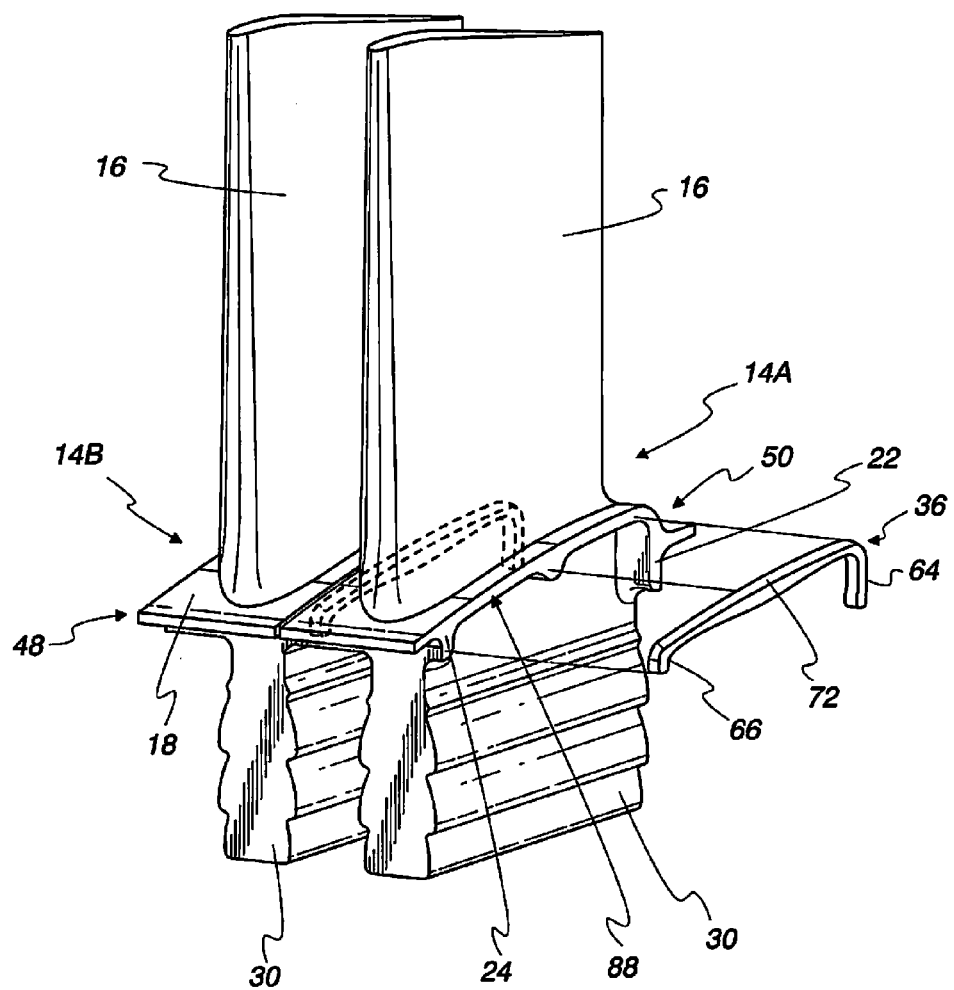
FIG. 6 is a partial exploded perspective view of the turbine blades showing the sealing surface of the turbine blade and the damper spaced therefrom.
Figure 7:
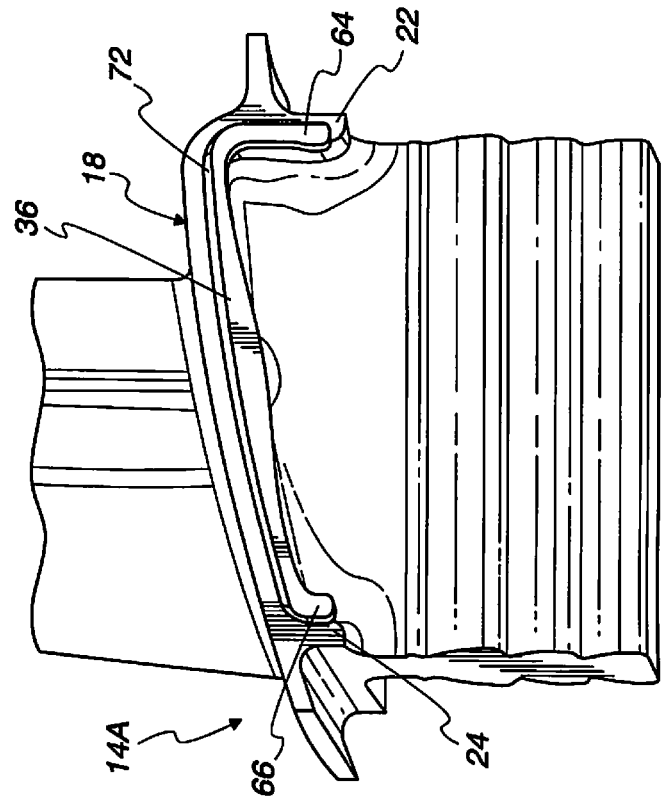
FIG. 7 is a side perspective view of the turbine blade showing the sealing surface defined by platform.
Figure 8:
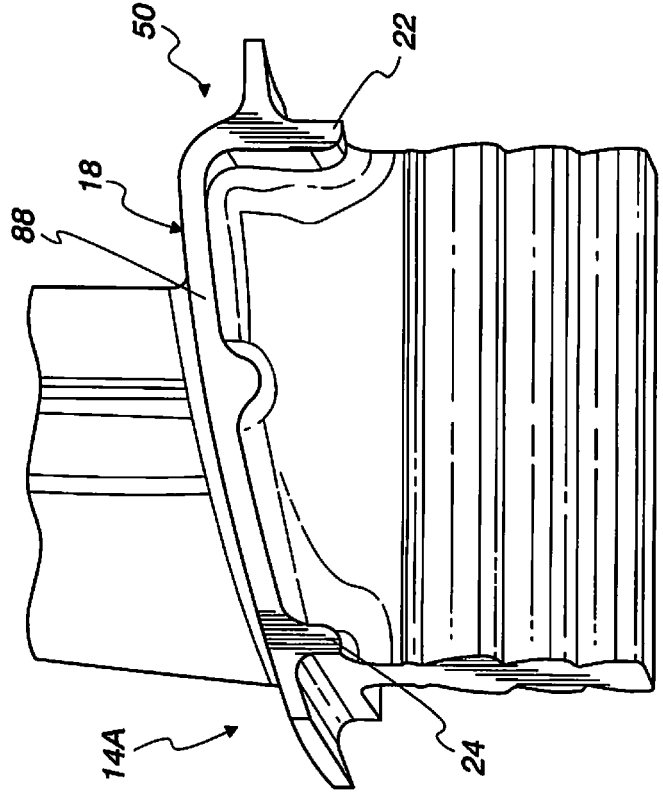
FIG. 8 is a side perspective view similar to FIG. 8 and showing the damper positioned against the sealing surface.

The drawings illustrate a gas turbine engine including a wheel 12, a first turbine blade 14A connected to wheel 12, and a second turbine blade 14B connected to wheel 12 as shown in FIGS. 1-3. The engine may further include additional turbine blades 14C-n (not shown), similar to turbine blades 14A, 14B, attached to wheel 12.

Each turbine blade 14A-n includes a platform 18 having a leading end 26, a trailing end 28, a first circumferential side 48, a second circumferential side 50, a radially-inward side 32, and a radially-outward side 40 as shown in FIG. 1. A root 30 extends radially inwardly from radially-inward side 32 of platform 18, and an airfoil 16 extends radially outwardly from radially-outward side 40 of platform 18. Root 30 is configured for engagement with a corresponding receptacle of wheel 12.

Radially-inward side 32 of platform 18 defines a pocket 38 extending inwardly from first circumferential side 48 of platform 18 as shown in FIG. 1. Alternatively, pocket 38 could extend inwardly from second circumferential side 50 of platform 18, with corresponding adaption of the structures described below. Pocket 38 is configured to receive a damper 36. As best shown in FIGS. 2 and 3, damper 36 is movable with respect to platform 18 between a first position wherein damper 36 is partially or fully recessed with pocket 38 and a second position wherein a portion of damper 36 extends from pocket 38 into contact with a mating surface of a platform 18 of an adjacent turbine blade 14n. The degree of extension and retraction of damper 36 with respect to pocket 38 may be selected as desired for a particular application.

Assembly of turbine blades 14A-n to wheel 12 may be facilitated with damper 36 in the first, recessed position. When the turbine engine spools up, centrifugal force acting upon damper 36 causes damper 36 to be moved to and maintained in the second, extended position. When in the second, extended position, for example, as shown in FIG. 3, damper 36 contacts surfaces of both the platform 18 of its corresponding turbine blade 14n, for example, turbine blade 14A, and the platform 18 of an adjacent turbine blade 14n, for example, turbine blade 14B. Friction between damper 36 and the two platforms 18 with which damper 36 is in contact dampens vibrations in one or both such platforms 18 and their corresponding turbine blades 14n. Also, when in the second, extended position, damper 36 at least partially seals the radially-inward sides of such platforms 18 from the radially-outward sides thereof.

More specifically, each platform 18 of the illustrated embodiment (which is merely illustrative of the invention as claimed and not to be construed as limiting it) includes a body portion 20, a first leg 22, and a second leg 24. First leg 22 extends radially inwardly from body portion 20 proximate leading end 26, and second leg 24 extends radially inwardly from body portion 20 proximate trailing end 28. Body portion 20, first leg 22 and second leg 24 cooperate to define pocket 38.

Pocket 38 includes a ceiling portion 42 that may be defined by a radially-inward surface of platform 18. A portion of ceiling portion 42 extending inwardly from first circumferential side 48 of platform 18 defines a platform beveled surface 52. Pocket 38 also includes first and second generally elongate wall portions 44, 46 that may be defined by inward surfaces of first and second legs 22, 24, respectively. Pocket 38 may further include a first flange 54 extending from first wall portion 44 toward second wall portion 46 at a first radial distance from ceiling portion 42, and a second flange 56 extending from second wall portion 46 toward first wall portion 44 at a second radial distance from ceiling portion 42. An inner surface of first flange 54 defines a first floor portion 55, and an inner surface of second flange 56 defines a second floor portion 57. A first lip 58 may extend from first flange 54 proximate a free end thereof, and a second lip 60 may extend from second flange 56 proximate a free end thereof. First wall portion 44, first floor portion 55 and first lip 58 correspond to define a first damper-retaining groove, and second wall portion 46, second floor portion 57 and second lip 60 correspond to define a second damper-retaining groove, as will be discussed further below.

In other embodiments, pocket 38 could be defined in other ways. For example, platform 18 could embody structure other than legs 22, 24 that cooperate with body portion 20 in order to define pocket 38.

Damper 36 of the illustrated embodiment includes a body portion 62, a first leg 64, a second leg 66, a first circumferential surface (or damper sealing surface) 82 and a second circumferential surface (unnumbered). First leg 64 extends radially inwardly from a leading end 68 of body portion 62 and terminates in a first free end (or foot) 78. Similarly, second leg 66 extends radially inwardly from a trailing end 70 of body portion 62 and terminates in a second free end (or foot) 80. A radially outward side of body portion 62 defines a damper beveled surface 72 complementary to pocket beveled surface 52.

Damper 36 is configured so that damper beveled surface 72 may slidingly engage with pocket beveled surface 52, and so that outer surfaces 74, 76 of first and second legs 64, 66, respectively may slidingly engage or be slightly spaced in an axial direction from first and second wall portions 44, 46 of platform 18, respectively. Also, damper 36 is configured so that one or both of free ends 78, 80 of damper 36 may rest on first and second floor portions 55, 57, respectively, when damper 36 is recessed within pocket 38. As such, no other structure, for example supporting tabs or like extending from the interior surface of pocket 38, is necessary for supporting damper 36 within pocket 38, for example, when damper 36 is recessed therein. First and second lips 58, 60 may, but need not, be sufficiently long to capture, respectively, first and second legs 64, 66 of damper 36 with damper 36 in the second position.

As discussed above, damper 36 may be placed recessed within pocket 38 prior to assembly of turbine blades 14n to wheel 12 in order to facilitate such assembly. When the turbine engine spools up, a centrifugal force acting upon damper 36 biases damper 36 in a radially outward direction relative to pocket 38, causing damper 36 to slide diagonally along the interface defined by pocket beveled surface 52 and damper beveled surface 72 to the second position where all or a portion of first circumferential surface 82 of damper 36 contacts a corresponding portion of a mating sealing surface 88 of second circumferential side 50 of platform 18 of an adjacent turbine blade 14n. In the second, extended position, body portion 62 of damper 36 engages with body portion 20 of the adjacent platform 18, and first and second legs 64, 66 of damper 36 engage with first end second legs 22, 24 of platform 18. In embodiments wherein platform 18 does not include first and second legs 22, 24, first and second legs 64, 66 of damper 36 engage with other structure of platform 18 directed radially inwardly from body portion 20. Also, as damper 36 moves from the first, recessed position to the second, extended position, free ends 78, 80 of first and second legs 64, 66 of damper 36 may depart from corresponding floor portions 55, 57 of corresponding platform 18.

The material and surface treatments used for damper 36 and platform 18, including any bearing and sealing surfaces thereof, may be selected as desired to allow for adequate sliding of damper 36 relative to platform 18 and for adequate sealing and vibration dampening (or energy dissipation) between damper 36, its corresponding platform 18, and an adjacent platform 18.

The angle of damper beveled surface 72 relative to first circumferential surface 82 may be selected as desired for a particular application. The angle of pocket beveled surface 52 typically would be complementary to the foregoing angle. Also, the mass and mass distribution of damper 36 may be selected as desired for a particular application.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A turbine blade damper system comprising
a platform having a leading end, a trailing end, a first circumferential side, a second circumferential side, a radially-outward side, and a radially-inward side, the radially-inward side defining a pocket extending circumferentially inwardly from the first circumferential side, the pocket having a ceiling portion, a first wall portion extending radially inward from the ceiling portion proximate the leading end, a second wall portion extending radially inward from the ceiling portion proximate the trailing end, a first floor portion extending from the first wall portion toward the second wall portion, and a second floor portion extending from the second wall portion toward the first wall portion, the ceiling portion defining a pocket beveled surface extending circumferentially inwardly from the first circumferential side, and the second circumferential side defining a platform sealing surface; and
a damper having a leading end, a trailing end, a first circumferential side, a second circumferential side, a body portion, a radially-outward side, a first leg portion extending radially inwardly from the leading end of the body portion, a second leg portion extending radially inwardly from the trailing end of the body portion, the first circumferential side defining a damper sealing surface, the radially-outward side defining a damper beveled surface;
the damper beveled surface slidingly engaged with the pocket beveled surface, and the damper movable with respect to the platform between a first position wherein at least a portion of the damper is recessed within the pocket and a second position wherein a lesser portion of the damper is recessed within the pocket and the damper sealing surface is engaged with a platform sealing surface of an adjacent platform, wherein the first and second leg portions of the damper define respectively a first outer surface and a second outer surface, wherein the first outer surface and the second outer surface are in sliding engagement with the first and second wall portions of the pocket, wherein the first and second leg portions of the damper define respectively a first foot and a second foot, wherein the first foot and the second foot are respectively engaged with the first and second floor portions when the damper is in the first position, and further comprising a first lip extending radially outwardly from the first floor portion proximate a free end of the first foot and a second lip extending radially outwardly from the second floor portion proximate a free end of the second foot.

2. The turbine blade damping system of claim 1, further comprising an airfoil extending radially outwardly from the radially-outward side of the platform.

3. The turbine blade damping system of claim 2, further comprising a root extending radially inwardly from the radially-inward side of the platform.

4. The turbine blade damping system of claim 1, further comprising an adjacent platform, the damper selectively engagable with the adjacent platform.

5. The turbine blade damping system of claim 4, the platform and the adjacent platform attached to a wheel.

6. The turbine blade damping system of claim 1, wherein the body portion and the first leg of the damper cooperate to define the damper sealing surface.

7. The turbine blade damping system of claim 1, wherein the body portion, the first leg, and the second leg of the damper cooperate to define the damper sealing surface.

8. A turbine blade damper system comprising
a plurality of platforms, each platform having a leading end, a trailing end, a first circumferential side, a second circumferential side, a radially-outward side, and a radially-inward side, the radially-inward side defining a pocket extending circumferentially inwardly from the first circumferential side, the pocket having a ceiling portion, a first wall portion extending radially inward from the ceiling portion proximate the leading end, a second wall portion extending radially inward from the ceiling portion proximate the trailing end, a first floor portion extending from the first wall portion toward the second wall portion, and a second floor portion extending from the second wall portion toward the first wall portion, the ceiling portion defining a pocket beveled surface extending circumferentially inwardly from the first circumferential side, and the second circumferential side defining a platform sealing surface; and
a damper having a leading end, a trailing end, a first circumferential side, a second circumferential side, a body portion, a radially-outward side, a first leg portion extending radially inwardly from the leading end of the body portion, a second leg portion extending radially inwardly from the trailing end of the body portion, the first circumferential side defining a damper sealing surface, the radially-outward side defining a damper beveled surface;
the damper beveled surface slidingly engaged with the pocket beveled surface of a first of the plurality of platforms, and the damper movable with respect to the first of the plurality of platforms between a first position wherein at least a portion of the damper is recessed within the pocket of the first of the plurality of platforms and a second position wherein a lesser portion of the damper is recessed within the pocket of the first of the plurality of platforms and the damper sealing surface is engaged with a platform sealing surface of a second of the plurality of platforms adjacent the first of the plurality of platforms, wherein the first and second leg portions of the damper define respectively a first outer surface and a second outer surface, wherein the first outer surface and the second outer surface are in sliding engagement the first and second wall portions of the pocket, wherein the first and second leg portions of the damper define respectively a first foot and a second foot, wherein the first foot and the second foot are respectively engaged with the first and second floor portions when the damper is in the first position, and each platform further comprising a first lip extending radially outwardly from the first floor portion proximate a free end of the first foot and a second lip extending radially outwardly from the second floor portion proximate a free end of the second foot.

9. The turbine blade damping system of claim 8, further comprising a root extending radially inwardly from the radially-inward side of the platform.

10. The turbine blade damping system of claim 9, further comprising an airfoil extending radially outwardly from the radially-outward side of each of the plurality of platforms.

11. The turbine blade damping system of claim 8, each of the plurality of platforms attached to a wheel.

12. The turbine blade damping system of claim 8, wherein the body portion and the first leg of the damper cooperate to define the damper sealing surface.

13. The turbine blade damping system of claim 8, wherein the body portion, the first leg, and the second leg of the damper cooperate to define the damper sealing surface.

14. The turbine blade damping system of claim 8, further comprising a second damper having a leading end, a trailing end, a first circumferential side, a second circumferential side, a body portion, a radially-outward side, a first leg portion extending radially inwardly from the leading end of the body portion, a second leg portion extending radially inwardly from the trailing end of the body portion, the first circumferential side defining a damper sealing surface, the radially-outward side defining a damper beveled surface;

the damper beveled surface slidingly engaged with the pocket beveled surface of the second of the plurality of platforms, and the damper movable with respect to the second of the plurality of platforms between a first position wherein at least a portion of the damper is recessed within the pocket of the second of the plurality of platforms and a second position wherein a lesser portion of the damper is recessed with the pocket of the second of the plurality of platforms and the damper sealing surface is engaged with a platform sealing surface of a third of the plurality of platforms adjacent the second of the plurality of platforms.

* * * * *